US010946827B2

(12) United States Patent
Yoshikawa

(10) Patent No.: US 10,946,827 B2
(45) Date of Patent: Mar. 16, 2021

(54) VEHICLE OCCUPANT PROTECTION DEVICE

(71) Applicant: SUBARU CORPORATION, Tokyo (JP)

(72) Inventor: Mitsuharu Yoshikawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 52 days.

(21) Appl. No.: 16/225,650

(22) Filed: Dec. 19, 2018

(65) Prior Publication Data

US 2019/0299915 A1  Oct. 3, 2019

(30) Foreign Application Priority Data

Mar. 29, 2018  (JP) .............................. JP2018-064347

(51) Int. Cl.
*B60R 21/2334*  (2011.01)
*B60R 21/233*   (2006.01)
(Continued)

(52) U.S. Cl.
CPC .... *B60R 21/2334* (2013.01); *B60R 21/01538* (2014.10); *B60R 21/01552* (2014.10);
(Continued)

(58) Field of Classification Search
CPC .............. B60R 21/2334; B60R 21/233; B60R 21/01552; B60R 21/023; B60R 22/195; B60R 21/01538; B60R 2021/23308
See application file for complete search history.

(56) References Cited

U.S. PATENT DOCUMENTS

2005/0104340 A1* 5/2005 Hasebe ................. B60R 21/233
                                                280/730.1
2013/0001934 A1* 1/2013 Nagasawa ............. B60R 21/203
                                                280/731
(Continued)

FOREIGN PATENT DOCUMENTS

DE       29702125 U1 *  6/1997  ........... B60R 22/195
JP     2006-256386 A     9/2006
(Continued)

OTHER PUBLICATIONS

Machine translation of JP-2006256386-A (Year: 2006).*
(Continued)

*Primary Examiner* — James A English
*Assistant Examiner* — Kurtis Nielson
(74) *Attorney, Agent, or Firm* — Chip Law Group

(57) ABSTRACT

A vehicle occupant protection device includes: a three-point seatbelt designed to be worn so as to cross the body of an occupant sitting in a seat of a vehicle; a force limiter that applies tension to the three-point seatbelt; an airbag device having an airbag designed to deploy in front of the upper body of the occupant sitting in the seat so as to support the upper body and head that are going to be thrown forward, the airbag having an upper-side portion, an outer-side portion, and an inner-side portion capable of deploying at different pressure levels; a controller that activates the force limiter and the airbag device upon a collision; and an occupant identification device that identifies the physique of the occupant sitting in the seat. The controller changes deployment of each portion of the airbag in accordance with the identified physique.

14 Claims, 9 Drawing Sheets

(51) Int. Cl.
   *B60R 21/015*   (2006.01)
   *B60R 22/02*    (2006.01)
   *B60R 22/195*   (2006.01)

(52) U.S. Cl.
   CPC .......... *B60R 21/233* (2013.01); *B60R 22/023* (2013.01); *B60R 22/195* (2013.01); *B60R 2021/23308* (2013.01)

(56) References Cited

U.S. PATENT DOCUMENTS

| | | | |
|---|---|---|---|
| 2016/0257273 | A1 | 9/2016 | Tada |
| 2018/0093632 | A1* | 4/2018 | Nagasawa ............ B60R 21/0136 |
| 2018/0370479 | A1* | 12/2018 | Ishiguro .............. B60R 21/2334 |
| 2019/0329671 | A1* | 10/2019 | Tanaka ................ G06K 9/00362 |
| 2020/0031306 | A1* | 1/2020 | Nakajima ............. B60R 21/264 |
| 2020/0039460 | A1* | 2/2020 | Zink ................... B60R 21/2338 |

FOREIGN PATENT DOCUMENTS

| | | | | |
|---|---|---|---|---|
| JP | 2006256386 | A | * | 9/2006 |
| JP | 2007-191077 | A | | 8/2007 |
| JP | 2007191077 | A | * | 8/2007 |
| JP | 2011-031656 | | | 2/2011 |
| JP | 4870369 | B2 | * | 2/2012 |
| JP | 2016-165994 | A | | 9/2016 |
| JP | 2016165994 | A | * | 9/2016 |

OTHER PUBLICATIONS

Machine translation of JP-2007191077-A (Year: 2007).*
Machine translation of JP-2016165994-A (Year: 2016).*
Machine translation of DE-29702125-U1 (Year: 1997).*
Office Action for JP Patent Application No. 2018-064347, dated Aug. 28, 2019, 04 pages of Office Action and 04 pages of English Translation.

* cited by examiner

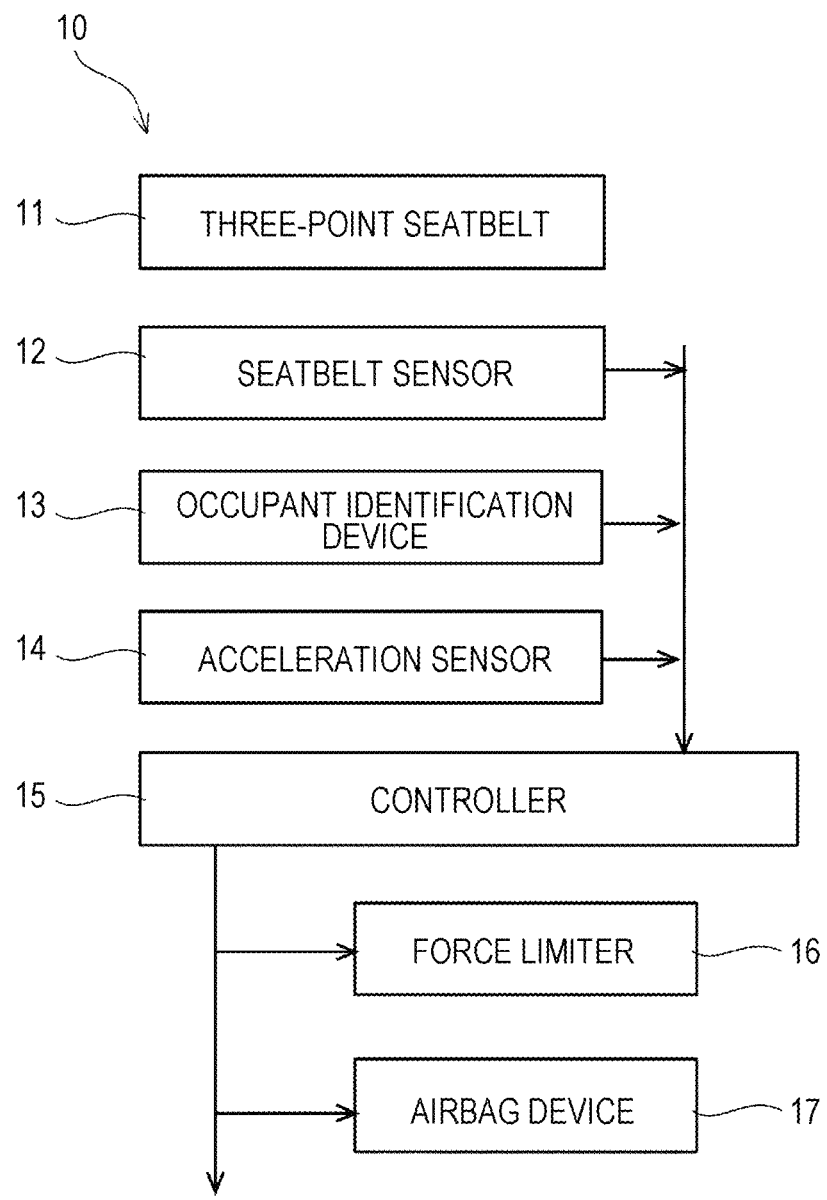

VEHICLE OCCUPANT PROTECTION DEVICE

CROSS-REFERENCE TO RELATED APPLICATIONS

The present application claims priority from Japanese Patent Application No. 2018-064347 filed on Mar. 29, 2018, the entire contents of which are hereby incorporated by reference.

BACKGROUND

1. Technical Field

The present invention relates to a vehicle occupant protection device.

2. Related Art

A vehicle occupant protection device has, for example, a three-point seatbelt designed to be worn so as to cross the body of an occupant sitting in a vehicle's seat and an airbag designed to deploy in front of the upper body of the occupant sitting in the seat. Japanese Unexamined Patent Application Publication No. 2011-031656 discloses an airbag designed to deploy in front of the upper body of an occupant sitting in a seat.

Thus, the seatbelt can suppress forward movement of the upper body of the occupant sitting in the seat, and by causing the airbag to impact the upper body that is still going to move forward, an impact force can be absorbed.

SUMMARY OF THE INVENTION

A vehicle occupant protection device according an aspect of the present invention includes: a three-point seatbelt designed to be worn so as to cross the body of an occupant sitting in a seat of a vehicle; a force limiter that applies tension to the three-point seatbelt; an airbag device including an airbag designed to deploy in front of the upper body of the occupant sitting in the seat so as to support the upper body and the head of the occupant that are going to be thrown forward, the airbag having an upper-side portion, an outer-side portion, and an inner-side portion capable of deploying at pressure levels different from each other; a controller that activates the force limiter and the airbag device upon a collision to protect the occupant sitting in the seat; and an occupant identification device that identifies the physique of the occupant sitting in the seat. The controller changes deployment of the upper-side portion, deployment of the outer-side portion, and deployment of the inner-side portion of the airbag in accordance with the identified physique of the occupant.

BRIEF DESCRIPTION OF THE DRAWINGS

FIG. 4 illustrates an occupant protection device according to an example of the present invention;

DETAILED DESCRIPTION

Hereinafter, an example of the present invention is described with reference to the drawings.

Occupants of various physiques may sit in a seat. An occupant who travels in a vehicle may have a large physique or a small physique.

If a seatbelt and an airbag are activated to each have a specific state irrespective of the physique of the occupant, the occupant may not necessarily be suitably protected.

For instance, if an occupant of a large physique sits in a seat, the force of the occupant's upper body that is going to move forward is large. Thus, there is a possibility that even after the upper body of the occupant impacts the deployed airbag, the upper body moves far forward and the head that has moved far forward strikes, for example, the windshield of a vehicle body.

To suppress the occurrence of such a state, increasing the restraint of the seatbelt and the deployment pressure of the airbag can be considered. However, for example, when only the deployment pressure of the airbag is increased, there is a possibility that after the head of an occupant of a small physique impacts the airbag such that the entire face sinks into the airbag, the neck bends backward, resulting in the head leaning backward and lagging behind the upper body.

Thus, a vehicle occupant protection device that suitably protects an occupant irrespective of the physique of the occupant and that provides an improved safety level is required.

Figure 1:
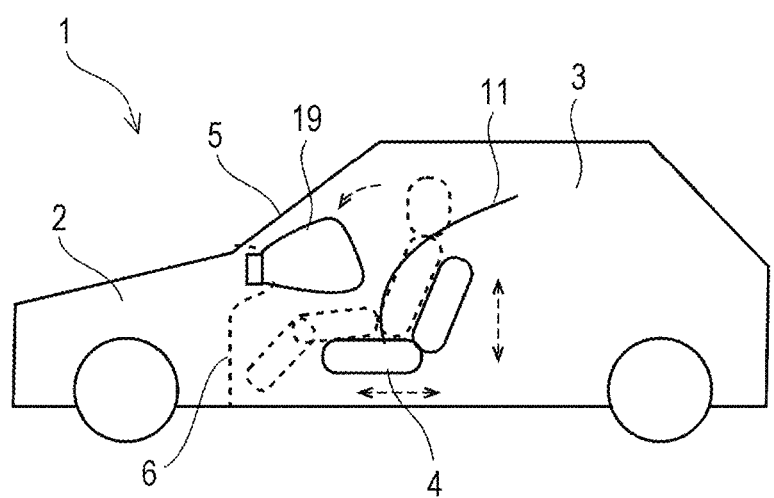
FIG. 1 schematically illustrates an automobile to which the present invention is applicable.

FIG. 1 schematically illustrates an automobile 1 to which the present invention is applicable.

The automobile 1 is an example of a vehicle.

The automobile 1 in FIG. 1 has a body 2. The middle part of the body 2 has an occupant compartment 3. An occupant who has entered the occupant compartment 3 sits in the seat 4. The position of the seat 4 is adjustable in the longitudinal direction of the body 2 and in the vertical direction in accordance with the physique of the occupant.

To protect the occupant in a collision, the automobile 1 has, for example, a three-point seatbelt 11 designed to be worn so as to cross the upper body of the occupant sitting in the seat 4 and an airbag 19 designed to deploy in front of the upper body of the occupant sitting in the seat 4.

Thus, the seatbelt 11 can suppress forward movement of the upper body of the occupant sitting in the seat 4, and by causing the airbag 19 to impact the upper body that is still going to move forward, an impact force can be absorbed.

However, occupants of various physiques may sit in the seat 4. An occupant who travels in the vehicle may have a large physique or a small physique.

If the seatbelt 11 and the airbag 19 are activated to each have a specific state irrespective of the physique of the occupant, the occupant may not necessarily be suitably protected.

Figure 2A:
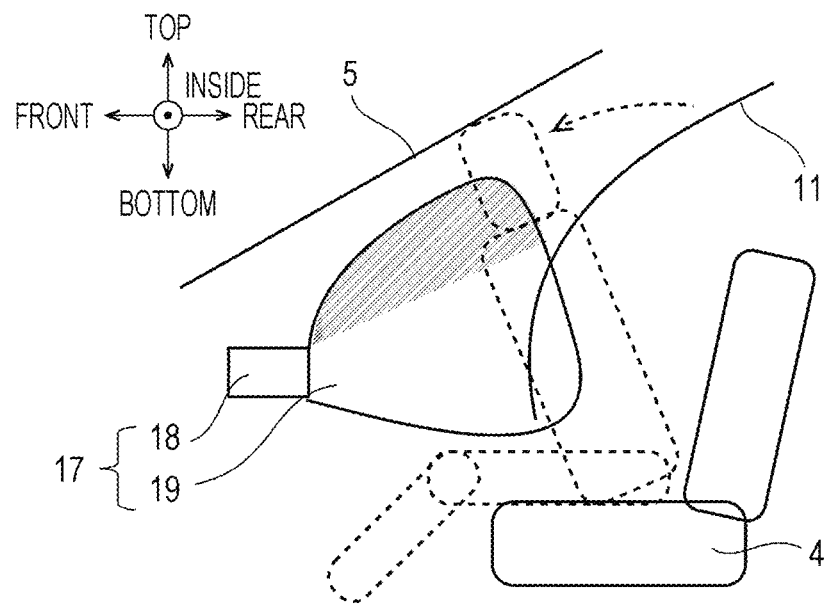
FIGS. 2A and 2B illustrate differences in states in which occupants of different physiques are protected.
Figure 2B:
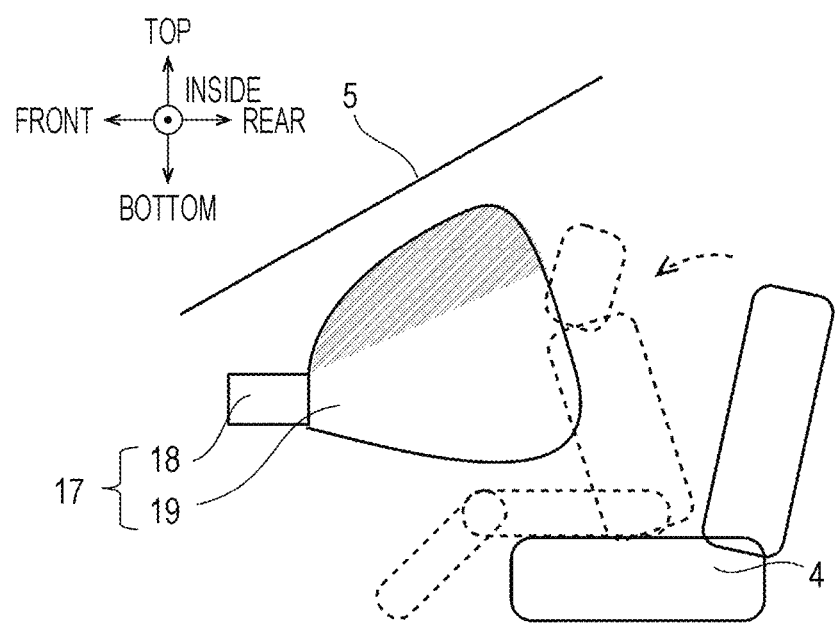

FIGS. 2A and 2B illustrate differences in states in which occupants of different physiques are protected.

If an occupant of a large physique sits in the seat 4 as illustrated in FIG. 2A, the force of the occupant's upper body that is going to move forward is great during a collision. Thus, there is a possibility that even after the upper body of the occupant impacts the deployed airbag 19, the upper body moves further forward and the head that has moved far forward strikes, for example, a windshield 5 of the body 2. To suppress this, increasing the deployment pressure of an upper-side portion 20 of the airbag 19 is considered, for example.

However, if the deployment pressure of the upper-side portion 20 of the airbag 19 is increased, as illustrated in FIG. 2B, there is a possibility that when the head of an occupant of a small physique sitting in the seat 4 impacts the airbag 19 such that the entire face of the occupant sinks into the airbag 19, the neck bends backward, resulting in the head leaning backward and lagging behind the upper body. Such a state is not desirable.

Figure 3A:
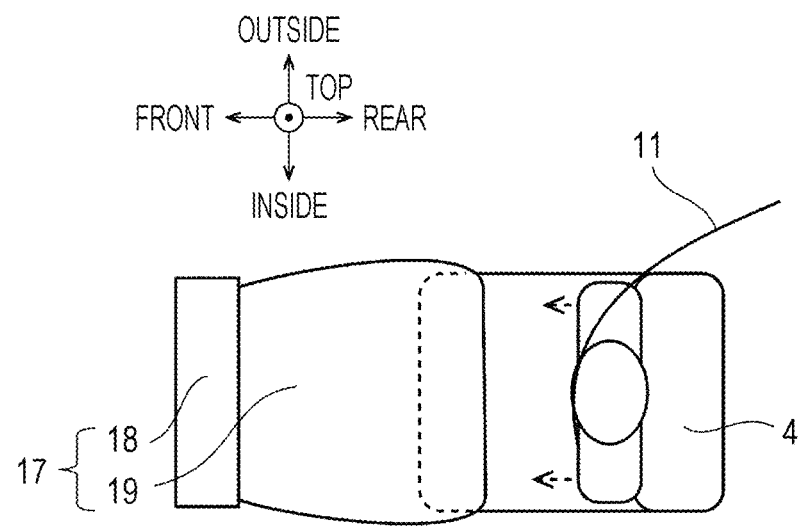
FIGS. 3A and 3B further illustrate differences in states in which occupants of different physiques are protected.

If an occupant of a small physique sits in the seat 4 as illustrated in FIG. 3A, the force of the occupant's upper body that is going to move forward is relatively small during a collision. Thus, the upper body of the occupant is less likely to lean forward against the three-point seatbelt 11. Even if the upper body of the occupant is going to lean forward against the seatbelt 11, the upper body of the occupant is likely to squarely impact the deployed airbag 19.

Figure 3B:
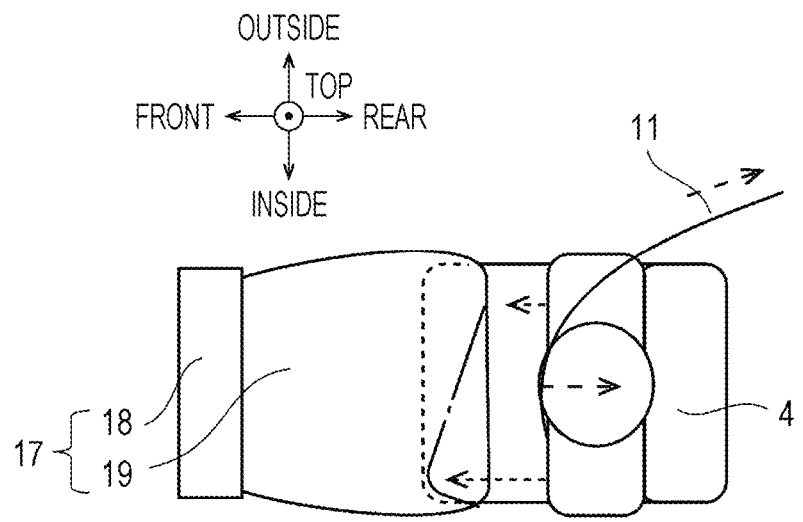

In contrast, if an occupant of a large physique sits in the seat 4 as illustrated in FIG. 3B, the force of the occupant's upper body that is going to move forward is great during a collision. Thus, the upper body of the occupant is likely to lean forward against the three-point seatbelt 11. The upper body of the occupant may also twist so that the inner-side shoulder not supported by the three-point seatbelt 11 is ahead of the outer-side shoulder. In this posture, the upper body of the occupant is going to lean forward against the three-point seatbelt 11. Thus, the upper body of the occupant is less likely to squarely impact the deployed airbag 19, resulting in a possibility of the airbag 19 not being able to appropriately support the upper body of the occupant and sufficiently absorb an impact force.

To suppress this, increasing the restraint of the three-point seatbelt 11 is considered. However, when only the restraint of the three-point seatbelt 11 is increased, a force to be concentrically exerted on the chest of the occupant is likely to act.

Thus, suitable protection in accordance with the physique of an occupant and the pursuit of higher safety are required for an occupant protection device 10 of the automobile 1.

FIG. 4 illustrates the occupant protection device 10 according to the example of the present invention.

The occupant protection device 10 in FIG. 4 includes the three-point seatbelt 11, a seatbelt sensor 12, an occupant identification device 13, an acceleration sensor 14, a controller 15, a force limiter 16, and an airbag device 17.

The seatbelt sensor 12 detects wearing of the three-point seatbelt 11 designed to be worn so as to cross the body of the occupant sitting in the seat 4 in the automobile 1.

The force limiter 16 is a device that applies tension to the three-point seatbelt 11. The force limiter 16 applies tension to the three-point seatbelt 11 up to a set load.

The seatbelt sensor 12, the force limiter 16, and the three-point seatbelt 11 together constitute a seatbelt device.

The airbag device 17 has, for example, a device body 18 installed in a dashboard 6, the airbag 19 capable of deploying from the device body 18 toward the rear of the automobile 1, and an inflator (not shown) that discharges highly pressurized gas into the airbag 19.

Figure 5A:
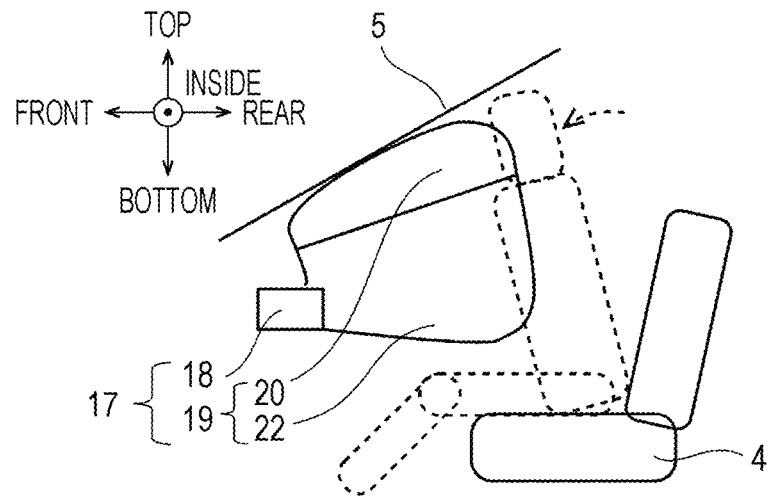
FIGS. 5A to 5C illustrate states in which an airbag in FIG. 4 is deployed.
Figure 5B:
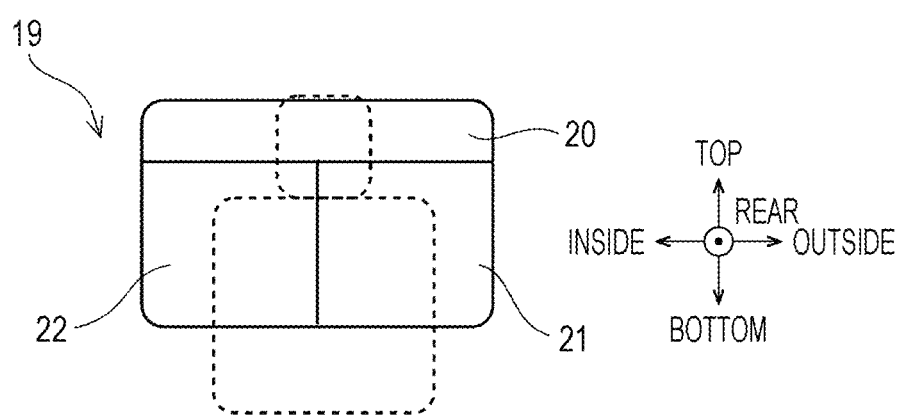
Figure 5C:
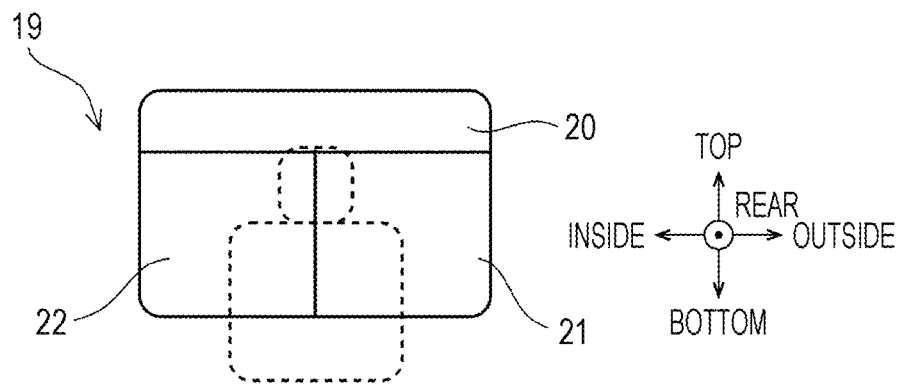

FIGS. 5A to 5C illustrate states in which the airbag 19 in FIG. 4 is deployed.

FIG. 5A illustrates a view when looking outward from the inside of the occupant compartment 3.

FIG. 5B and FIG. 5C illustrate views when looking forward from the rear of the occupant compartment 3.

The airbag 19 in FIGS. 5A to 5C has three bags of the upper-side portion 20, an outer-side portion 21, and an inner-side portion 22. The three bags are integrated, and the entirety of the integrated bags deploys in front of the upper body of an occupant sitting in the seat 4.

As illustrated in FIGS. 5A and 5B, the upper-side portion 20 deploys in front of the head of an occupant who is sufficiently large to strike the windshield 5 by being thrown forward.

Moreover, as illustrated in FIG. 5A, the top surface of the upper-side portion 20 strikes the windshield 5 as a result of a load being applied.

The outer-side portion 21 and the inner-side portion 22 deploy below the upper-side portion 20 and, as illustrated in FIGS. 5A and 5B, deploy in front of the upper body of the occupant of a large physique.

As illustrated in FIG. 5C, the upper body and head of an occupant of a small physique are primarily thrown together onto the outer-side portion 21 and the inner-side portion 22.

This enables the deployed airbag 19 to support the upper body and head of the occupant that are going to be primarily thrown forward, irrespective of the physique of the occupant and to absorb an impact force.

The occupant identification device 13 detects an occupant sitting in the seat 4. For instance, the occupant identification device 13 has a camera for capturing the interior of the automobile 1, detects that an occupant has entered the vehicle, and identifies the physique of the occupant.

The acceleration sensor 14 detects acceleration generated in the automobile 1.

In a collision, the controller 15 activates the force limiter 16 and the airbag device 17 to protect an occupant sitting in the seat 4.

In accordance with the identified physique of the occupant, the controller 15 changes tension applied by the force limiter 16 and changes the deployment of the airbag 19.

The controller 15 can deploy the upper-side portion 20, the outer-side portion 21, and the inner-side portion 22 of the airbag 19 at different pressure levels.

For instance, by preparing multiple inflators for each of the upper-side portion 20, the outer-side portion 21, and the inner-side portion 22 and individually controlling the number of inflators to be ignited, the controller 15 can deploy the upper-side portion 20, the outer-side portion 21, and the inner-side portion 22 of the airbag 19 at different pressure levels.

Figure 6:
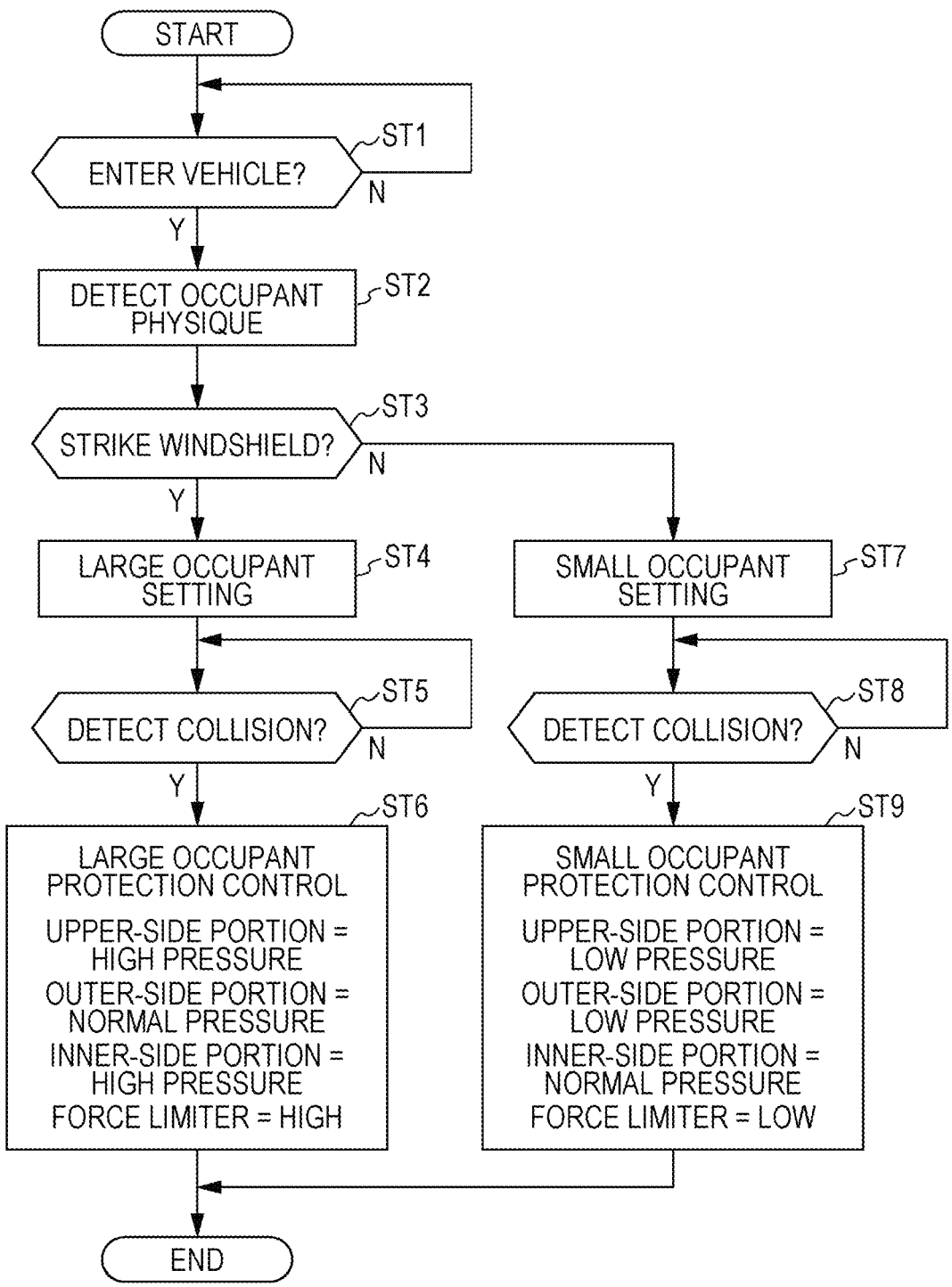
FIG. 6 is a flowchart of occupant protection control performed by a controller in FIG. 4.

FIG. 6 is a flowchart illustrating occupant protection control performed by the controller 15 in FIG. 4.

The controller 15 repeatedly performs the processing illustrated in FIG. 6.

When performing the occupant protection control illustrated in FIG. 6, the controller 15 determines whether an occupant has entered the vehicle (step ST1). For instance, the controller 15 determines whether an occupant has entered the vehicle in accordance with detection of an occupant by the occupant identification device 13 or detection of wearing of the seatbelt 11 by the seatbelt sensor 12.

The controller 15 then identifies the physique of the occupant who has entered the vehicle (step ST2). The controller 15 may identify the physique of the occupant by using the occupant identification device 13.

The controller 15 determines whether the head of the occupant of the identified physique may strike the windshield 5 (step ST3).

It should be noted that in the above determination, the controller 15 may also determine whether the head of the occupant may strike the windshield 5 in consideration of the position of the seat 4 in the longitudinal direction of the body 2 and the position of the seat 4 in the vertical direction of the body 2.

The upper body of the occupant primarily leans forward from the lower back of the occupant sitting in the seat 4.

If the windshield 5 is within the radius of rotation of the body above the lower back about a transverse axis, the controller 15 may determine that the head may strike the windshield 5. Here, the radius of rotation can be determined in accordance with the position of the lower back of the occupant sitting in the seat 4 and the height of the body above the lower back.

If the occupant is sufficiently large for the head to strike the windshield 5, the controller 15 performs large occupant setting processing in accordance with the physique of the occupant (step ST4). The controller 15, for example, increases tension applied by the force limiter 16 and individually sets deployment pressure levels for the respective portions of the airbag 19, that is, the upper-side portion 20, the outer-side portion 21, and the inner-side portion 22.

The controller 15 then detects a collision (step ST5). For instance, when the acceleration sensor 14 detects strong acceleration due to a collision, the controller 15 detects the collision.

The controller 15 activates the force limiter 16 and the airbag 19 in accordance with the large occupant setting. By doing so, the controller 15 performs large occupant protection control (step ST6).

If the occupant is sufficiently small for the head not to strike the windshield 5, the controller 15 performs small occupant setting processing in accordance with the physique of the occupant (step ST7). The controller 15, for example, decreases tension applied by the force limiter 16 and individually sets deployment pressure levels for the respective portions of the airbag 19, that is, the upper-side portion 20, the outer-side portion 21, and the inner-side portion 22.

The controller 15 then detects a collision (step ST8). For instance, when the acceleration sensor 14 detects strong acceleration due to a collision, the controller 15 detects the collision.

The controller 15 activates the force limiter 16 and the airbag 19 in accordance with the small occupant setting. By doing so, the controller 15 performs small occupant protection control (step ST9).

Figure 7A:
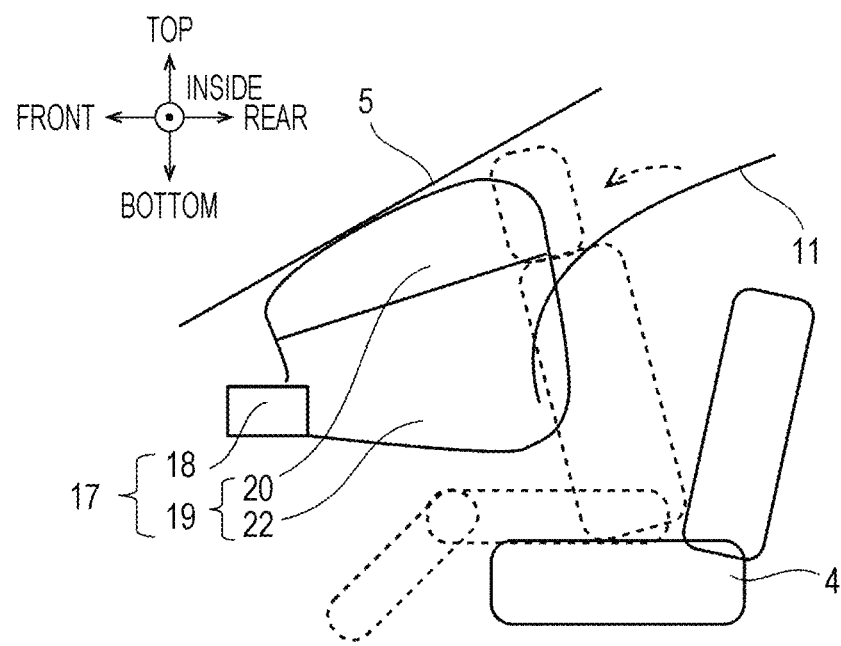
FIGS. 7A and 7B illustrate states in which an occupant of a large physique is protected.
Figure 7B:
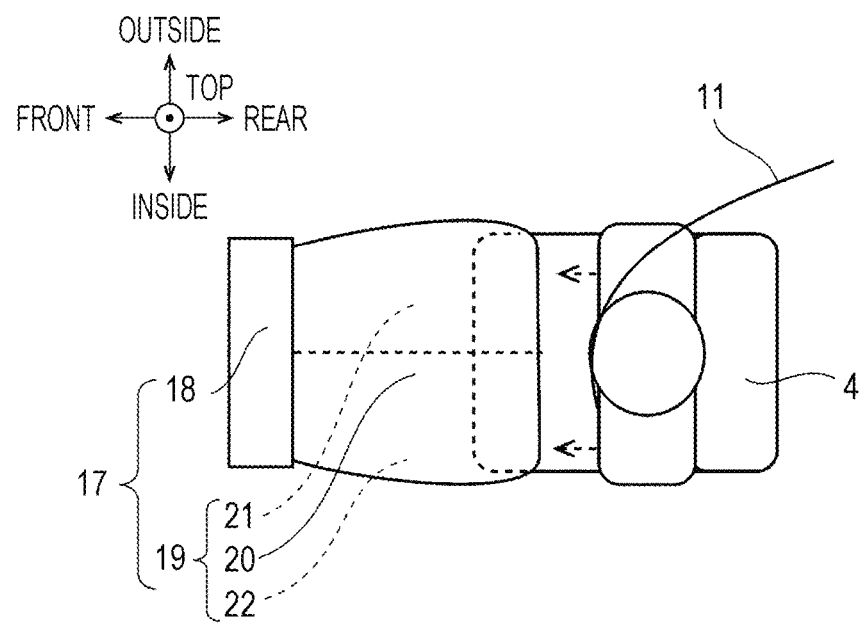

FIGS. 7A and 7B illustrate states in which an occupant of a large physique is protected.

FIG. 7A illustrates a view when looking outward from the inside of the occupant compartment 3.

FIG. 7B is an illustration when the occupant compartment 3 is viewed from above.

For an occupant of a large physique, the controller 15 sets a load at which the force limiter 16 loosens the three-point seatbelt 11 to a level higher than usual. This enables the seatbelt 11 to strongly support the upper body of the occupant of a large physique, thereby suppressing forward movement of the upper body.

In addition, the controller 15 does not change the gas pressure of the outer-side portion 21 of the airbag 19, that is, the gas pressure of the outer-side portion 21 remains the same as usual. Meanwhile, the controller 15 increases the gas pressure levels of the upper-side portion 20 and the inner-side portion 22 to levels higher than usual.

Thus, the deployment pressure levels of the upper-side portion 20 and the inner-side portion 22 of the airbag 19 are higher than the deployment pressure level of the outer-side portion 21 of the airbag 19.

The upper-side portion 20 deploys under high pressure, compared with a case in which the occupant has a small physique, which is described later.

Moreover, the deployment pressure of the inner-side portion 22 that deploys in front of the inner-side shoulder of the occupant sitting in the seat 4, not supported by the three-point seatbelt 11, is higher than that of the outer-side portion 21 that deploys in front of the outer-side shoulder of the occupant sitting in the seat 4, supported by the three-point seatbelt 11.

As illustrated in FIG. 7A, under the load of the occupant sitting in the seat 4, the top surface of the upper-side portion 20 of the airbag 19 strikes the windshield 5 of the automobile 1.

The upper-side portion 20 deployed under high pressure supports the large occupant's head that is going to be thrown forward, thereby suppressing forward movement of the head before the head strikes the windshield 5.

In addition, the three-point seatbelt 11 strongly supports the outer-side upper body of the occupant, and the inner-side portion 22 deployed under high pressure strongly supports the inner-side upper body of the occupant, thereby suppressing forward movement of the upper body of the occupant. This decreases a possibility of the head of the occupant leaning backward and lagging behind the upper body.

Figure 8A:
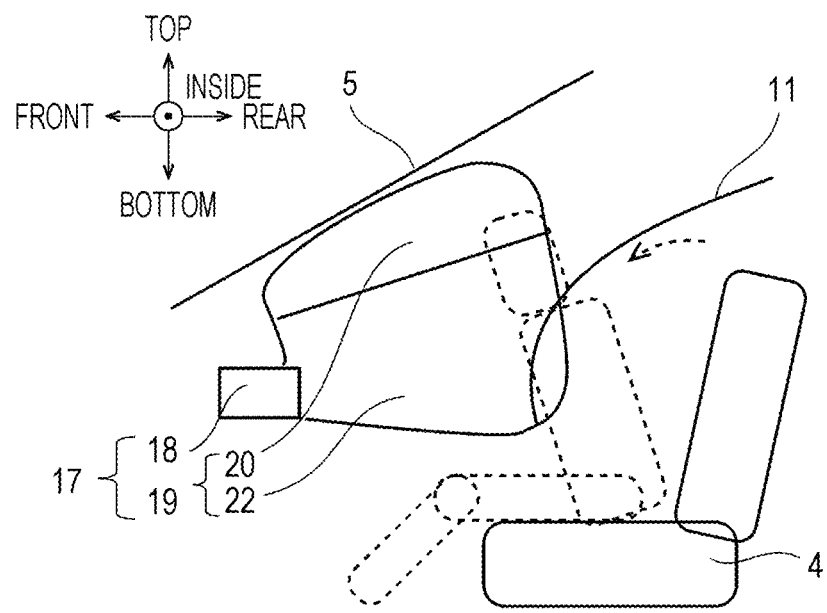
FIGS. 8A and 8B illustrate states in which an occupant of a small physique is protected.
Figure 8B:
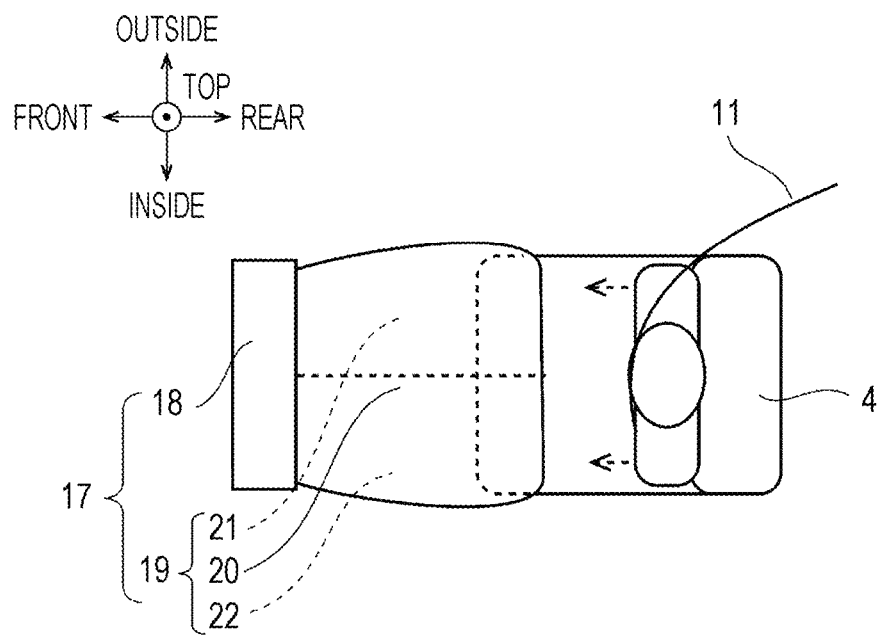

FIGS. 8A and 8B illustrate states in which an occupant of a small physique is protected.

FIG. 8A illustrates a view when looking outward from the inside of the occupant compartment 3.

FIG. 8B is an illustration when the occupant compartment 3 is viewed from above.

For an occupant of a small physique, the controller 15 sets a load at which the force limiter 16 loosens the three-point seatbelt 11 to a level lower than usual. Thus, the seatbelt 11 loosely supports the upper body of the occupant of a small physique. Thus, the chest of the occupant is less likely to be subjected to a force from the seatbelt 11.

The controller 15 does not change the gas pressure of the inner-side portion 22 of the airbag 19, that is, the gas pressure of the inner-side portion 22 remains the same as usual. Meanwhile, the controller 15 decreases the gas pressure levels of the upper-side portion 20 and the outer-side portion 21 to levels lower than usual.

Thus, the deployment pressure levels of the upper-side portion 20 and the outer-side portion 21 of the airbag 19 are lower than the deployment pressure level of the inner-side portion 22 of the airbag 19.

The upper-side portion 20 deploys under low pressure, compared with when the occupant has a large physique.

Moreover, the deployment pressure of the inner-side portion 22 that deploys in front of the inner-side shoulder of the occupant sitting in the seat 4, not supported by the three-point seatbelt 11, is higher than that of the outer-side portion 21 that deploys in front of the outer-side shoulder of the occupant sitting in the seat 4, supported by the three-point seatbelt 11.

In addition to the low-pressure deployment of the outer-side portion 21 of the airbag 19, by the three-point seatbelt 11 supporting up to a low load, the occupant's head that is going to be thrown forward is likely to be thrown forward together with the upper body. Thus, the chest is less likely to be subjected to pressure.

Then, the head and the upper body being thrown forward primarily impact the inner-side portion 22 and the outer-side portion 21 of the airbag 19 and are thereby supported by these portions. In this state, an impact force can be slowly absorbed.

Thus, in the example, the airbag 19 designed to deploy in front of the upper body of an occupant has the upper-side portion 20, the outer-side portion 21, and the inner-side portion 22 capable of deploying at different pressure levels. The controller 15 changes the respective deployments of the upper-side portion 20, the outer-side portion 21, and the inner-side portion 22 of the airbag 19 in accordance with the identified physique of the occupant.

This enables the occupant protection device 10 to protect the occupant sitting in the seat 4 in accordance with the physique of the occupant through a combination of the airbag 19 designed to deploy in accordance with the physique of the occupant and the force limiter 16 that applies tension to the three-point seatbelt 11.

Accordingly, the occupant protection device 10 of the automobile 1 can suitably protect an occupant sitting in the seat 4 irrespective of the physique of the occupant.

For instance, if the identified physique of the occupant is large, in the example, the upper-side portion 20 deploys under high pressure, compared with when the identified physique of the occupant is small.

Thus, the upper-side portion 20 deployed under high pressure supports the head of the occupant of a large physique, which suppresses forward movement of the head. This decreases a possibility that the head of the occupant with a large physique still moves far forward after impacting the airbag 19 and strikes, for example, the windshield 5 of the body 2. This can improve protective performance for the head.

For an occupant of a small physique, the deployment pressure of the upper-side portion 20 is not increased. Thus, the airbag 19 can support the head and the whole upper body of the occupant being thrown onto the airbag 19 in the state in which the occupant has been thrown onto the airbag 19. Unlike the case in which the airbag 19 deploys so that the deployment pressure level of the upper-side portion 20 is relatively higher than the deployment pressure levels of the portions below the upper-side portion 20, it is possible to decrease a possibility of the neck bending backward, resulting in the head that has been thrown onto the airbag 19 leaning backward and lagging behind the upper body. This can improve protective performance for the neck.

In addition, in the example, when comparing the deployment pressure levels of the outer-side portion 21 and the inner-side portion 22, the deployment pressure of the inner-side portion 22 that deploys in front of the inner-side shoulder of the occupant sitting in the seat 4, not supported by the three-point seatbelt 11 is higher than that of the outer-side portion 21 that deploys in front of the outer-side shoulder of the occupant sitting in the seat 4, supported by the three-point seatbelt 11. Thus, even if the upper body of the occupant sitting in the seat 4 slips out of the three-point seatbelt 11 and is thrown forward in a state in which the upper body twists so that the inner-side shoulder is ahead of the outer-side shoulder, the deployed airbag 19 can absorb an impact force by supporting the upper body while suppressing the twist of the upper body. The airbag 19 suitably supports the twisted upper body of the occupant being thrown forward, which enables to suppress forward movement of the upper body of the occupant.

In the example, if the identified physique of the occupant is large, a load at which the force limiter 16 loosens the three-point seatbelt 11 is set to be high as compared with when the identified physique of the occupant is small.

Thus, the three-point seatbelt 11 strongly supports the upper body of the large occupant and absorbs a large amount of an impact force, which enables forward movement of the upper body to be suppressed.

For the upper body of an occupant of a small physique, by avoiding excessively strong support by the three-point seatbelt 11, it is possible to suppress a strong force to be exerted on the chest restrained by the seatbelt 11. This can improve protective performance for the chest.

In particular, in the example, if the identified physique of an occupant is large, the deployment pressure levels of the upper-side portion 20 and the inner-side portion 22 are higher than the deployment pressure level of the outer-side portion 21 that deploys in front of the shoulder supported by the three-point seatbelt 11. Thus, even if the upper body of the occupant of a large physique slips out of the three-point seatbelt 11 and is thrown forward in a state in which the upper body twists such that the inner-side shoulder is ahead of the outer-side shoulder, by deploying the upper-side portion 20 and the inner-side portion 22 at high pressure levels, the airbag 19 supports the occupant while suppressing the twist of the upper body. In this way, the airbag 19 can absorb an impact force. That is, even if the twisted upper body of the occupant of a large physique is going to be thrown forward, the airbag 19 strongly supports the head while suppressing the twist of the upper body, which enables to suppress further forward movement of the upper body. This decreases a possibility that the upper body moves far forward and the head strikes, for example, the windshield 5 of the body 2.

In particular, in the example, if the identified physique of an occupant is small, the deployment pressure levels of the upper-side portion 20 and the outer-side portion 21 are lower than the deployment pressure level of the inner-side portion 22 that deploys in front of the shoulder not supported by the three-point seatbelt 11. Thus, even if the upper body of the occupant of a small physique slips out of the three-point seatbelt 11 and is thrown forward in a state in which the upper body twists such that the inner-side shoulder is ahead of the outer-side shoulder, by deploying the upper-side portion 20 and the outer-side portion 21 at low pressure levels, the deployed airbag 19 can absorb an impact force relatively slowly while suppressing the twist of the upper body. That is, even if the twisted upper body of the occupant of a small physique is going to be thrown forward, the airbag 19 can absorb an impact force by supporting the whole upper body while suppressing the twist of the upper body and suppressing a strong impact to be exerted on the head and the upper body. This can improve protective performance for the chest and neck.

In the example, the airbag 19 deploys so that at least the upper-side portion 20 strikes the automobile 1 under the load of the occupant sitting in the seat 4. Thus, even for an occupant of a large physique, the airbag 19 can deploy so as to be interposed between the head of the occupant and the automobile 1, which can decrease a possibility of the head of the occupant of a large physique directly striking the automobile 1. This can improve protective performance for the head.

The example described above is an instance of a preferable example of the present invention. However, the present invention is not limited to this instance, and various modifications or changes can be made without departing from the scope of the invention.

Figure 9:
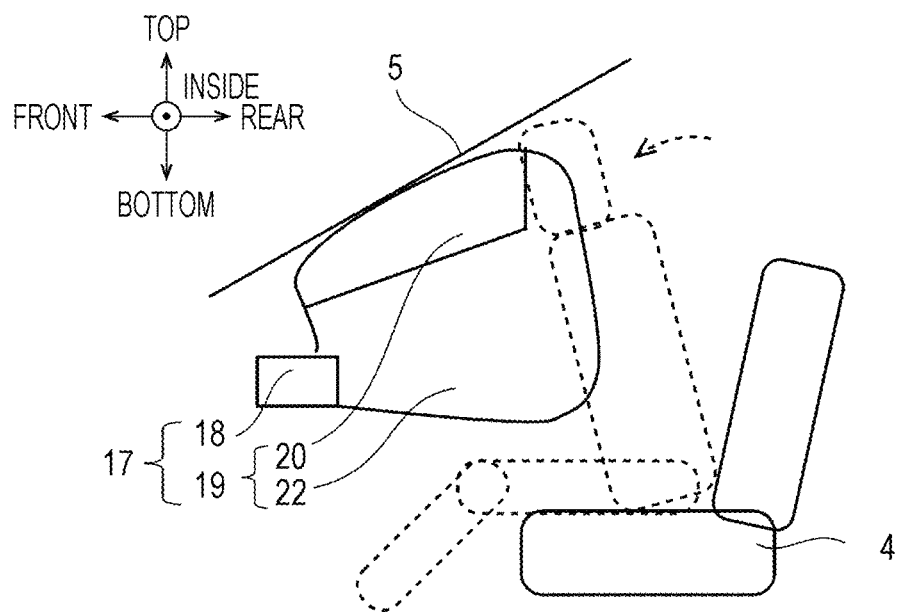
FIG. 9 illustrates a modification example of the airbag.

FIG. 9 illustrates a modification example of the airbag 19.

In FIG. 9, the upper-side portion 20 of the airbag 19 deploys so that in the longitudinal direction of the body 2, the upper-side portion 20 is shorter than the inner-side portion 22 and the outer-side portion 21. Thus, the occupant does not directly impact the upper-side portion 20. Even for the airbag 19 as illustrated in FIG. 9, by individually controlling the respective deployment pressure levels of the upper-side portion 20, the inner-side portion 22, and the outer-side portion 21, an effect similar to that described in the example can be obtained.

Figure 10:
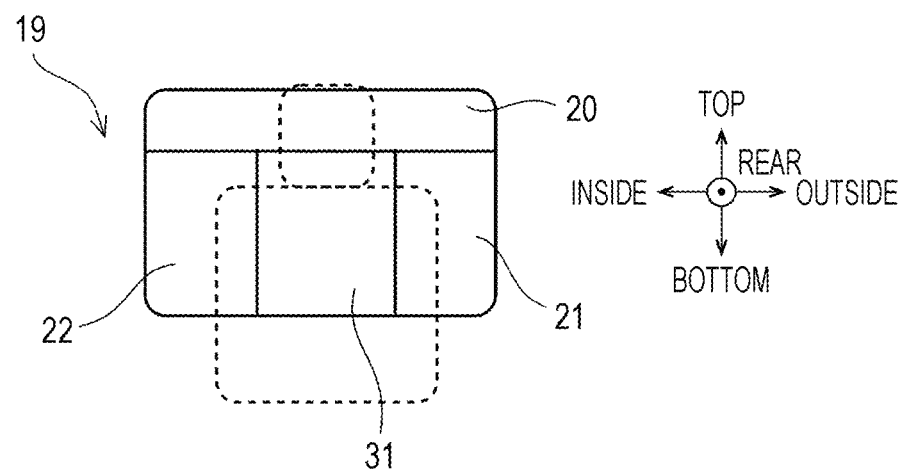
FIG. 10 illustrates another modification example of the airbag.

FIG. 10 illustrates another modification example of the airbag 19.

The airbag 19 in FIG. 10 has a middle portion 31 between the inner-side portion 22 and the outer-side portion 21. The upper-side portion 20 is located above the inner-side portion 22, the middle portion 31, and the outer-side portion 21. Even for the airbag 19 into which such four bags are integrated, by, for example, deploying the middle portion 31 at a normal pressure level and deploying the upper-side portion 20, the inner-side portion 22, and the outer-side portion 21 at pressure levels similar to those described in the example, an effect similar to that described in the example can be obtained.

The example described above is an occupant protection device that protects an occupant sitting in a front seat positioned on the front side of the occupant compartment.

The occupant protection device of the present invention can be used to protect an occupant sitting in a seat such as a rear seat other than a front seat.

The invention claimed is:

1. A vehicle occupant protection device comprising:
   a three-point seatbelt designed to be worn so as to cross a body of an occupant sitting in a seat of a vehicle;
   a force limiter configured to apply tension to the three-point seatbelt;
   an airbag device comprising an airbag designed to deploy in front of an upper body of the occupant sitting in the seat so as to support the upper body and a head of the occupant that are going to be thrown forward, the airbag comprising an upper-side portion, an outer-side portion, and an inner-side portion capable of deploying at pressure levels different from each other;
   a controller configured to activate the force limiter and the airbag device upon a collision to protect the occupant sitting in the seat; and
   an occupant identification device configured to identify a physique of the occupant sitting in the seat, wherein
   the controller is further configured to deploy an entirety of the airbag in front of the upper body of the occupant sitting in the seat,
   when the entirety of the airbag is deployed, the upper-side portion, the outer-side portion, and the inner-side portion are integrated with each other such that the outer-side portion and the inner-side portion are deployed below the upper-side portion, and
   in the entirety of the deployed airbag, the upper-side portion and the inner-side portion are deployed at pressure levels higher than a pressure level of the outer-side portion when the identified physique of the occupant is large, and the upper-side portion and the outer-side portion are deployed at pressure levels lower than a pressure level of the inner-side portion when the identified physique of the occupant is small.

2. The vehicle occupant protection device according to claim 1,
   wherein when the identified physique of the occupant is large, the controller is further configured to deploy the upper-side portion under high pressure, compared with when the identified physique of the occupant is small.

3. The vehicle occupant protection device according to claim 2,
   wherein when the identified physique of the occupant is large, the controller is further configured to set a load at which the force limiter loosens the three-point seatbelt to be high as compared with when the identified physique of the occupant is small.

4. The vehicle occupant protection device according to claim 3,
   wherein the airbag deploys such that at least the upper-side portion strikes the vehicle under a load of the occupant sitting in the seat.

5. The vehicle occupant protection device according to claim 3, wherein
   the airbag further comprises a middle portion between the inner-side portion and the outer-side portion, and being capable of deploying at a pressure level different from other portions of the airbag, and
   when the airbag is deployed, the upper-side portion, the outer-side portion, the inner-side portion, and the middle portion are integrated with each other such that the outer-side portion, the inner-side portion, and the middle portion are deployed below the upper-side portion.

6. The vehicle occupant protection device according to claim 2,
   wherein the airbag deploys such that at least the upper-side portion strikes the vehicle under a load of the occupant sitting in the seat.

7. The vehicle occupant protection device according to claim 2, wherein
   the airbag further comprises a middle portion between the inner-side portion and the outer-side portion, and being capable of deploying at a pressure level different from other portions of the airbag, and
   when the airbag is deployed, the upper-side portion, the outer-side portion, the inner-side portion, and the middle portion are integrated with each other such that the outer-side portion, the inner-side portion, and the middle portion are deployed below the upper-side portion.

8. The vehicle occupant protection device according to claim 1,
   wherein when the identified physique of the occupant is large, the controller is further configured to set a load at which the force limiter loosens the three-point seatbelt to be high as compared with when the identified physique of the occupant is small.

9. The vehicle occupant protection device according to claim 8,
   wherein the airbag deploys such that at least the upper-side portion strikes the vehicle under a load of the occupant sitting in the seat.

10. The vehicle occupant protection device according to claim 8, wherein
    the airbag further comprises a middle portion between the inner-side portion and the outer-side portion, and being capable of deploying at a pressure level different from other portions of the airbag, and when the airbag is deployed, the upper-side portion, the outer-side portion, the inner-side portion, and the middle portion are integrated with each other such that the outer-side portion, the inner-side portion, and the middle portion are deployed below the upper-side portion.

11. The vehicle occupant protection device according to claim 1, wherein the airbag deploys such that at least the upper-side portion strikes the vehicle under a load of the occupant sitting in the seat.

12. The vehicle occupant protection device according to claim 1, wherein the airbag further comprises a middle portion between the inner-side portion and the outer-side portion, and being capable of deploying at a pressure level different from other portions of the airbag, and when the airbag is deployed, the upper-side portion, the outer-side portion, the inner-side portion, and the middle portion are integrated with each other such that the outer-side portion, the inner-side portion, and the middle portion are deployed below the upper-side portion.

13. A vehicle occupant protection device comprising:

a three-point seatbelt designed to be worn so as to cross a body of an occupant sitting in a seat of a vehicle;

a force limiter configured to apply tension to the three-point seatbelt;

an airbag device comprising an airbag designed to deploy in front of an upper body of the occupant sitting in the seat so as to support the upper body and a head of the occupant that are going to be thrown forward, the airbag comprising an upper-side portion, an outer-side portion, and an inner-side portion capable of deploying at pressure levels different from each other;

a controller configured to activate the force limiter and the airbag device upon a collision to protect the occupant sitting in the seat; and an occupant identification device configured to identify a physique of the occupant sitting in the seat, wherein the controller is further configured to deploy an entirety of the airbag in front of the upper body of the occupant sitting in the seat, when the entirety of the airbag is deployed, the upper-side portion, the outer-side portion, and the inner-side portion are integrated with each other such that the outer-side portion and the inner-side portion are deployed below the upper-side portion, and in the entirety of the deployed airbag, the upper-side portion and the inner-side portion are deployed at pressure levels higher than a pressure level of the outer-side portion when the identified physique of the occupant is large.

14. A vehicle occupant protection device comprising:

a three-point seatbelt designed to be worn so as to cross a body of an occupant sitting in a seat of a vehicle;

a force limiter configured to apply tension to the three-point seatbelt;

an airbag device comprising an airbag designed to deploy in front of an upper body of the occupant sitting in the seat so as to support the upper body and a head of the occupant that are going to be thrown forward, the airbag comprising an upper-side portion, an outer-side portion, and an inner-side portion capable of deploying at pressure levels different from each other;

a controller configured to activate the force limiter and the airbag device upon a collision to protect the occupant sitting in the seat; and an occupant identification device configured to identify a physique of the occupant sitting in the seat, wherein the controller is further configured to deploy an entirety of the airbag in front of the upper body of the occupant sitting in the seat, when the entirety of the airbag is deployed, the upper-side portion, the outer-side portion, and the inner-side portion are integrated with each other such that the outer-side portion and the inner-side portion are deployed below the upper-side portion, and in the entirety of the deployed airbag, the upper-side portion and the outer-side portion are deployed at pressure levels lower than a pressure level of the inner-side portion when the identified physique of the occupant is small.

* * * * *